United States Patent
Ogawara (10) Patent No.: US 9,510,380 B2
(45) Date of Patent: Nov. 29, 2016

(54) COMMUNICATION APPARATUS, COMMUNICATION SYSTEM, AND COMPUTER PROGRAM

(71) Applicant: Osamu Ogawara, Kanagawa (JP)

(72) Inventor: Osamu Ogawara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 101 days.

(21) Appl. No.: 14/174,160

(22) Filed: Feb. 6, 2014

(65) Prior Publication Data

US 2014/0254581 A1 Sep. 11, 2014

(30) Foreign Application Priority Data

Mar. 5, 2013 (JP) .................................. 2013-042642
Oct. 31, 2013 (JP) .................................. 2013-226114

(51) Int. Cl.
*H04W 76/02* (2009.01)
*H04W 8/00* (2009.01)
*H04W 84/18* (2009.01)

(52) U.S. Cl.
CPC .......... *H04W 76/023* (2013.01); *H04W 8/005* (2013.01); *H04W 76/021* (2013.01); *H04W 84/18* (2013.01)

(58) Field of Classification Search
CPC ... H04W 48/12; H04W 8/005; H04W 48/20; H04W 48/14; H04W 8/26; H04W 84/18
See application file for complete search history.

(56) References Cited

U.S. PATENT DOCUMENTS

2007/0140194 A1* 6/2007 Lee ............................... 370/338
2007/0171910 A1  7/2007 Kumar
2010/0054154 A1* 3/2010 Lambert ........... H04L 29/12311 370/254
2010/0211785 A1* 8/2010 Park ..................... H04L 29/1232 713/168
2011/0222518 A1* 9/2011 Ota ................................. 370/338
2012/0008571 A1  1/2012 Li et al.
2013/0182614 A1  7/2013 Kumar et al.
2014/0056293 A1  2/2014 Kumar et al.

FOREIGN PATENT DOCUMENTS

EP    2 219 412 A2    8/2010
JP    2003-161722    6/2003

(Continued)

OTHER PUBLICATIONS

Extended European Search Report issued Jul. 23, 2014 in Patent Application No. 14153813.2.

*Primary Examiner* — Ian N Moore
*Assistant Examiner* — Lakeram Jangbahadur
(74) *Attorney, Agent, or Firm* — Oblon, McClelland, Maier & Neustadt, L.L.P.

(57) ABSTRACT

A communication apparatus is capable of making wireless communication without using an access point, by using a network identifier having communication identification information identifying a class of communication setting containing an IP address and frequency information. The communication apparatus includes: a detecting unit that detects another communication apparatus causing failure of the wireless communication due to overlap of the network identifier; and a changing unit that changes the network identifier when the detecting unit detects another communication apparatus causing failure of the wireless communication. The changing unit changes the network identifier so as to change the IP address of the communication apparatus or a frequency that the communication apparatus uses.

13 Claims, 8 Drawing Sheets

(56) References Cited

FOREIGN PATENT DOCUMENTS

| JP | 2011-188238 | 9/2011 |
| KR | 10-2006-0071031 A | 6/2006 |
| WO | WO 2007/044597 A2 | 4/2007 |

* cited by examiner

| BYTE NUMBER | 0 | 1 | 2 | 3 | 4 | 5 | 6 | 7 | 8 | 9 | 10 | 11 |
|---|---|---|---|---|---|---|---|---|---|---|---|---|
| TERMINAL IDENTIFIER | 0 | 0 | 1 | 6 | 4 | 1 | E | D | 1 | E | 5 | A |

FIG.4B

| BYTE NUMBER | 0 | 1 | 2 | 3 | 4 | 5 | 6 | 7 | 8 | 9 | 10 | 11 |
|---|---|---|---|---|---|---|---|---|---|---|---|---|
| TERMINAL IDENTIFIER | A | A | B | G | E | B | 4 | 3 | B | 4 | F | 0 |

FIG.4C

| BYTE NUMBER | 0 | 1 | 2 | 3 | 4 | 5 | 6 | 7 | 8 | 9 | 10 | 11 |
|---|---|---|---|---|---|---|---|---|---|---|---|---|
| TERMINAL IDENTIFIER | 0 | 1 | 2 | 3 | 4 | 5 | 6 | 7 | 8 | 9 | 0 | 1 |

FIG.4D

| BYTE NUMBER | 0 | 1 | 2 | 3 | 4 | 5 | 6 | 7 | 8 | 9 | 10 | 11 |
|---|---|---|---|---|---|---|---|---|---|---|---|---|
| TERMINAL IDENTIFIER | 1 | 7 | 3 | 6 | 8 | 9 | 5 | 3 | 5 | 7 | 7 | 9 |

FIG.5

BYTE NUMBER

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| SSID | R | T | C | 0 | 0 | 1 | W | i | r | e | l | e | s | s | D | e |

BYTE NUMBER

| | 16 | 17 | 18 | 19 | 20 | 21 | 22 | 23 | 24 | 25 | 26 | 27 | 28 | 29 | 30 | 31 |
|---|----|----|----|----|----|----|----|----|----|----|----|----|----|----|----|----|
| SSID | v | 0 | E | 0 | 0 | 0 | 1 | 6 | 4 | 1 | E | D | 1 | E | 5 | A |

0 TO 2 BYTES: FIXED CHARACTER STRING INDICATING THAT WIRELESS COMMUNICATION IS PERFORMED BY THIS SYSTEM

3 TO 5 BYTES: SETTING ID INDICATING COMMUNICATION SETTINGS TO BE USED FOR COMMUNICATION

6 TO 19 BYTES: APPARATUS NAME (SET BY USER)

20 TO 31 BYTES: TERMINAL IDENTIFIER

FIG.6

| SETTING ID | 1 | 2 | 3 | 4 | ... |
|---|---|---|---|---|---|
| COMMUNICATION MODE | AD HOC | AD HOC | AD HOC | AD HOC | ... |
| AUTHENTIC SYSTEM | OPEN SYSTEM | OPEN SYSTEM | OPEN SYSTEM | OPEN SYSTEM | ... |
| ENCRYPTION SYSTEM | WEP (Pass:XXX) | WEP (Pass:XXX) | WEP (Pass:XXX) | WEP (Pass:XXX) | ... |
| FREQUENCY CHANNEL | 11 | 11 | 12 | 12 | ... |
| TRANSMISSION STANDARD | IEEE802.11n | IEEE802.11n | IEEE802.11n | IEEE802.11n | ... |
| COMMUNICATION PROTOCOL | IPv4 | IPv4 | IPv4 | IPv6 | ... |
| IP ADDRESS | 169.254.1.1 | 169.254.1.3 | 169.254.1.1 | 2001:0db8:bd05:01d2: 288a:1fc0:0001:10ee | ... |
| SUBNET MASK (PREFIX) | 255.255.0.0 | 255.255.0.0 | 255.255.0.0 | 2001:0db8:bd05:01d2 | ... |

COMMUNICATION APPARATUS, COMMUNICATION SYSTEM, AND COMPUTER PROGRAM

CROSS-REFERENCE TO RELATED APPLICATIONS

The present application claims priority to and incorporates by reference the entire contents of Japanese Patent Application No. 2013-042642 filed in Japan on Mar. 5, 2013 and Japanese Patent Application No. 2013-226114 filed in Japan on Oct. 31, 2013.

BACKGROUND OF THE INVENTION

1. Field of the Invention

The present invention relates to a communication apparatus capable of making wireless communication without using an access point, a communication system, and a computer program that is executed by a computer controlling the above-mentioned communication apparatus.

2. Description of the Related Art

Conventionally known are systems such as ad hoc and wireless fidelity (Wifi) direct with which a plurality of apparatuses make communication without using an access point, by using a transmission standard such as the IEEE802.11n that is the same as that of a wireless local area network (LAN).

To make communication with the communication systems, it is necessary to perform setting of a wireless network rightly on the communication apparatuses that make communication. The setting includes various items such as an internet protocol (IP) address, a subnet mask, an authentic system, an encryption system, and an encryption key corresponding to the encryption system. It is difficult for a user with little knowledge to perform setting of the wireless network from scratch.

For coping with this point, Japanese Laid-open Patent Publication No. 2011-188238 discloses a terminal that generates a service set identifier (SSID) by using an IP address and a terminal identifier thereof and generates a beacon signal containing the SSID. The communication apparatus enables another terminal that has received the beacon signal to acquire the IP address of the terminal that is a transmission source, from the SSID contained in the beacon signal and make connection by using the acquired IP address.

It should be noted that the SSID is used as an identifier for identifying an access point in the wireless LAN communication standard of the IEEE802.11 series. Each access point and each terminal apparatus communicate with only terminal apparatuses having an identical SSID generated. Accordingly, the SSID can be a network identifier for identifying a network that each apparatus joins.

Furthermore, in the communication without using an access point, the communication apparatus that outputs the beacon signal and receives connection from another apparatus serves a function corresponding to the access point.

A state where a plurality of communication apparatuses having a common SSID and IP address are present can be made due to setting mistake or the like in some cases. When the apparatuses are present at close positions and the communication apparatus that receives connection transmits the beacon signal, the following failure occurs. That is, another communication apparatus that requests connection cannot make communication normally even if another communication apparatus tries to make communication with the communication apparatus to which it desires to be connected based on the received beacon signal. This is because the SSID and the IP address overlap and the communication apparatus cannot identify a communication party normally. When a plurality of frequency channels can be used, the above-mentioned failure occurs when the frequency channel that is used is also common.

To avoid this state, it is sufficient that a user operates the communication apparatus transmitting the beacon signal to change setting of the SSID (or information that is used for generating the SSID), the IP address, or the frequency channel so as to eliminate overlap of the SSID, the IP address, or the frequency channel.

This, however, arises a problem in that the change of the setting of this type imposes a heavy burden on the user with little knowledge relating to network communication.

The technique described in Japanese Laid-open Patent Publication No. 2011-188238 as mentioned above cannot solve the problem that occurs due to the overlap of the setting. In addition, the problem can occur in the same manner even when wireless communication standards other than the IEEE802.11 series are used.

In view of the above-mentioned background, there is a need to enable a user with little knowledge relating to network communication to avoid failure of wireless communication due to overlap of setting easily.

SUMMARY OF THE INVENTION

It is an object of the present invention to at least partially solve the problems in the conventional technology.

A communication apparatus is capable of making wireless communication without using an access point, by using a network identifier having communication identification information identifying a class of communication setting containing an IP address and frequency information. The communication apparatus includes: a detecting unit that detects another communication apparatus causing failure of the wireless communication due to overlap of the network identifier; and a changing unit that changes the network identifier when the detecting unit detects another communication apparatus causing failure of the wireless communication. The changing unit changes the network identifier so as to change the IP address of the communication apparatus or a frequency that the communication apparatus uses.

A communication apparatus is capable of making wireless communication without using an access point, by using a network identifier having a terminal identifier identifying the communication apparatus. The communication apparatus includes: a detecting unit that detects another communication apparatus causing failure of the wireless communication due to overlap of the network identifier; a changing unit that changes the network identifier when the detecting unit detects another communication apparatus causing failure of the wireless communication. The changing unit changes the network identifier so as to change the terminal identifier of the communication apparatus.

A computer program product includes a non-transitory computer-usable medium having computer-readable program codes embodied in the medium. The program codes when executed causes a computer to execute: detecting another communication apparatus causing failure of wireless communication due to overlap of a network identifier; and changing the network identifier when another communication apparatus causing failure of the wireless communication is detected at the detecting.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of the invention are described in detail with reference to the drawings.

Figure 1:
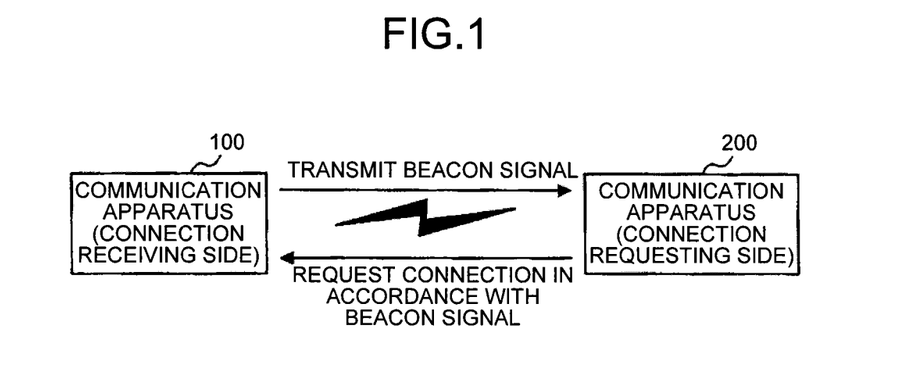
FIG. 1 is a diagram illustrating an example of communication that is performed by communication apparatuses as an embodiment of a communication apparatus and a communication system according to the invention.

First, FIG. 1 illustrates an example of communication that is performed by communication apparatuses as an embodiment of a communication apparatus and a communication system according to the invention.

As illustrated in FIG. 1, the communication apparatuses as the embodiment of the invention include a communication apparatus 100 at a connection receiving side and a communication apparatus 200 at a connection requesting side. When the communication apparatus 100 at the connection receiving side is powered ON, the communication apparatus 100 generates an SSID as a network identifier for identifying a network to which it belongs automatically and transmits a beacon signal containing the SSID to the periphery through a wireless communication interface (I/F).

When the communication apparatus 200 at the connection requesting side detects the beacon signal, the communication apparatus 200 reads information necessary for communication from the beacon signal (details thereof will be described later). Then, the communication apparatus 200 requests connection to a transmission source of the beacon signal based on the read information automatically or in accordance with an instruction by a user.

When the communication apparatus 100 permits the connection in response to the request, a state where data can be transmitted and received between the communication apparatus 100 and the communication apparatus 200 is made.

The above-mentioned communication apparatus 100 can be configured as a projector as a projecting apparatus that receives data of images or moving images from another communication apparatus, for example, and projects the images or the moving images. The communication apparatus 200 can be configured as a terminal apparatus such as a personal computer (PC) that transmits data for projection to the projector.

Obviously the communication apparatuses may be configured as any apparatuses other than these.

Figure 2:
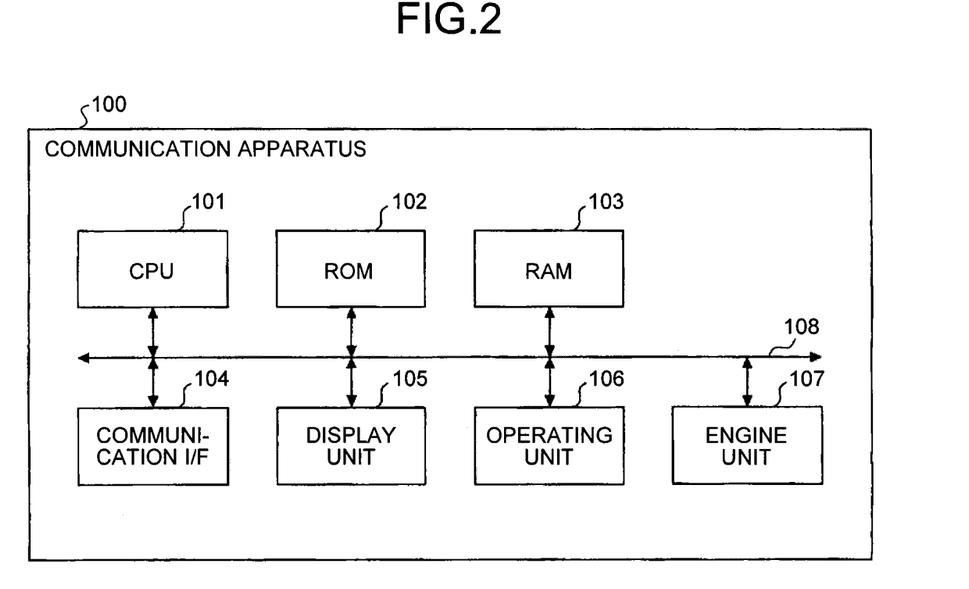
FIG. 2 is a diagram illustrating the hardware configuration of one communication apparatus as illustrated in FIG. 1.

Next, FIG. 2 illustrates the hardware configuration of the communication apparatus 100.

As illustrated in FIG. 2, the communication apparatus 100 includes a central processing unit (CPU) 101, a read only memory (ROM) 102, a random access memory (RAM) 103, a communication interface (I/F) 104, a display unit 105, an operating unit 106, and an engine unit 107, and is configured by connecting them with a system bus 108.

The CPU 101 executes a computer program stored in the ROM 102 by using the RAM 103 as a work area so as to control operations of the communication apparatus 100 overall. With this, the communication apparatus 100 can achieve various functions including control relating to elimination of overlap of setting, which will be described later.

The ROM 102 is a non-volatile semiconductor storage device that can hold internal data such as the program that is executed by the CPU 101 even when the communication apparatus 100 is powered OFF.

The RAM 103 is a volatile semiconductor storage device that temporarily holds the program and data that are read from the above-mentioned storage device.

The communication I/F 104 is an interface for making communication with external apparatuses. Although the communication apparatus 100 includes at least an interface for making wireless communication, it may also include an interface for making wired communication. A protocol that is used for communication is optional.

The display unit 105 is a display unit for presenting information to a user and can be configured by a liquid crystal display, a lamp, or the like.

The operating unit 106 is an operating unit for receiving an operation from the user and can be configured by a touch panel, buttons, or the like. The display unit 105 and the operating unit 106 may be configured integrally.

The engine unit 107 is a unit that performs physical input/output other than the communication. Functions that the engine unit 107 should have are totally different depending on the configuration of the communication apparatus 100. For example, when the communication apparatus 100 is configured as a projector, the engine unit 107 corresponds to a projection optical system for projecting video images onto a screen. When the communication apparatus 100 is configured as a printer, the engine unit 107 corresponds to a print engine for forming images on sheets by using an electrophotography system, an ink jet system, or the like. When the communication apparatus 100 is configured as a scanner, the engine unit 107 corresponds to a scanner engine that scans images of documents. When the communication apparatus 100 is configured as a document accumulation apparatus, the engine unit 107 corresponds to a storage that stores therein a large volume of data. Alternatively, the communication apparatus 100 may not include the engine unit 107.

The hardware configuration of the communication apparatus 200 is the same as that of the above-mentioned communication apparatus 100. The communication apparatus 200 may not include the engine unit 107 as in the communication apparatus 100. Note that a shape, a size, the number, and the like thereof are different depending on functions of the apparatus.

One characteristic point is that when there is another communication apparatus having overlapping network identifier and address information so as to cause failure of wireless communication, the failure is avoided automatically. The following describes detailed configuration for achieving this characteristic point.

When there is a wireless communication apparatus having a network identifier, an IP address, and a frequency channel all of which overlap with those that are used between one communication apparatus 100 and one communication apparatus 200, communication between the one communication apparatus 100 and the one communication apparatus 200 cannot be made due to interference failure. The embodiment of the application has the following characteristic point. That is, before the communication between the one communication apparatus 100 and the one communication apparatus 200 is started and during the communication between the one communication apparatus 100 and the one communication apparatus 200, the communication apparatus having the same network identifier as that of the communication apparatus 100 is detected and the network identifier is changed. With this, any of the IP address, the frequency channel, and the terminal identifier is changed so as to avoid the interference failure.

Figure 3:
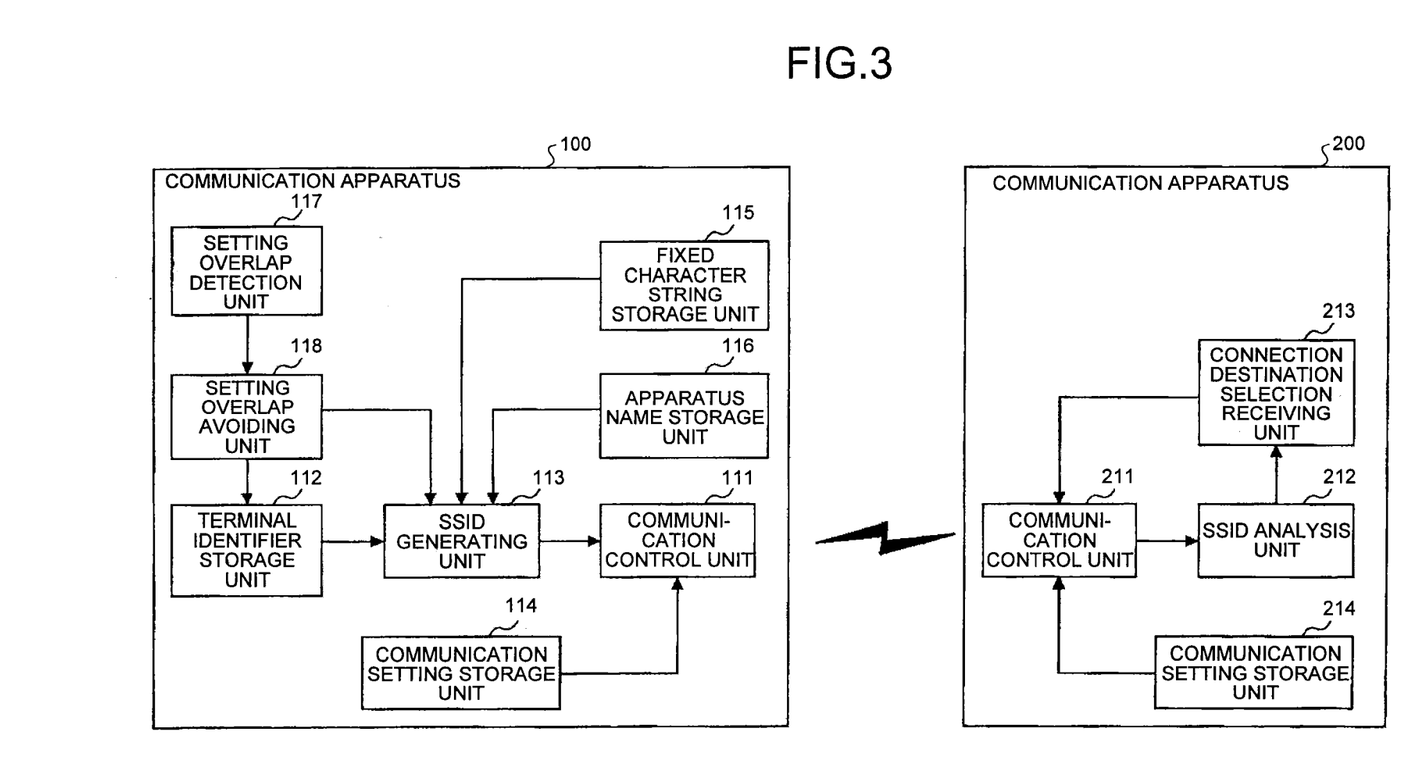
FIG. 3 is a diagram illustrating the configurations of functions that the one communication apparatus and the other communication apparatus as illustrated in FIG. 1 have.

First, FIG. 3 illustrates the configurations of functions that the communication apparatus 100 and the communication apparatus 200 have. FIG. 3 mainly illustrates the functions for avoiding the above-mentioned failure of the wireless communication.

As illustrated in FIG. 3, the communication apparatus 100 includes a communication control unit 111, a terminal identifier storage unit 112, an SSID generating unit 113, a communication setting storage unit 114, a fixed character string storage unit 115, an apparatus name storage unit 116, a setting overlap detection unit 117, and a setting overlap avoiding unit 118. Functions of these respective units are executed when the CPU 101 executes the necessary program stored in the ROM 102 and the RAM 103.

The communication control unit 111 has a function of making wireless communication with external apparatuses including the communication apparatus 200 by using any of communication settings stored in the communication setting storage unit 114 and an SSID generated by the SSID generating unit 113. The wireless communication includes a stage where the communication control unit 111 transmits a beacon signal generated based on the SSID to the periphery and receives connection, and a stage where the communication control unit 111 permits an apparatus that has requested the connection based on the beacon signal to be connected and transmits and receives upper layer data. For the permission of the connection, the communication control unit 111 performs authentication of the other apparatus with passwords or the like if necessary.

The terminal identifier storage unit 112 is an identifier storage unit for storing therein a terminal identifier for identifying the communication apparatus 100. The generation of the terminal identifier is executed when the communication apparatus 100 is powered ON. Alternatively, the generation of the terminal identifier may be executed at a time point when the wireless communication function is made valid after the communication apparatus 100 is powered ON. When the setting overlap detection unit 117 detects another communication apparatus having an overlapping SSID, the terminal identifier is regenerated by the setting overlap avoiding unit 118 in some cases. The terminal identifier may be generated automatically or a user may set a desired value of the terminal identifier. When the user sets the desired value of the terminal identifier, the user can set it by operating the operating unit 106 or accessing the communication apparatus 100 from an external apparatus.

FIGS. 4A to 4D illustrate examples of the terminal identifier.

Figure 4A:
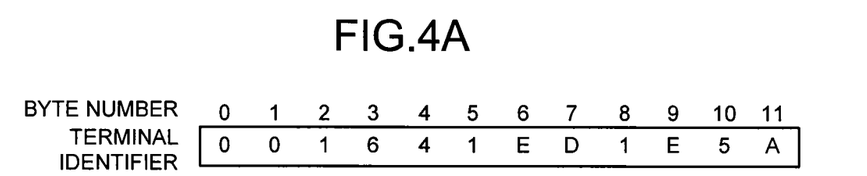
FIGS. 4A to 4D are views illustrating examples of terminal identifiers.

It is desired that the terminal identifier does not overlap with those of other communication apparatuses. The terminal identifier is preferably generated by using a media access control (MAC) address, for example. FIG. 4A illustrates an example of the terminal identifier that describes the MAC address of the communication apparatus 100 with the American standard code for information interchange (ASCII) code.

Figure 4B:
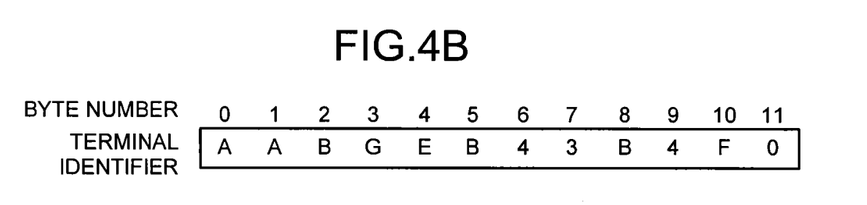

Note that when the terminal identifier is contained in the SSID, anyone can acquire the SSID from the beacon signal so as to acquire the MAC address from the SSID. When it is not desired to allow an unrelated third party to know the MAC address, it is preferable to add certain conversion to the MAC address. FIG. 4B is an example in which the respective characters of the terminal identifier as illustrated in FIG. 4A are converted in accordance with a conversion rule in which specific numbers and specific alphabets are associated with each other, such as 0 to A, 1 to B, and 2 to C, and the numbers are converted to the alphabets and the alphabets are converted to the numbers.

An apparatus sharing the conversion rule can obtain the MAC address from the terminal identifier. With the one-to-one correspondence conversion as above, it is guaranteed that the terminal identifier does not overlap with those of other communication apparatuses at the same level as the case where the MAC address is used with no conversion.

Figure 4C:
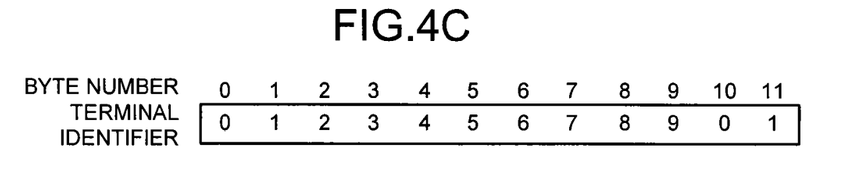
Figure 4D:
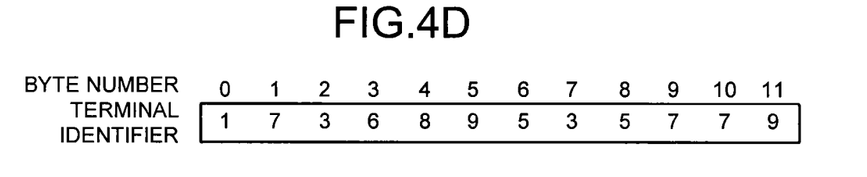

In addition, a user may specify the terminal identifier directly as illustrated in FIG. 4C, and the terminal identifier may be also generated by using the random number each time as illustrated in FIG. 4D.

The number of bytes of the terminal identifier is optional and is desirably determined previously. When the terminal identifier is described in the SSID as it is, the number of bytes of the terminal identifier is required to be set such that necessary information other than the terminal identifier can be described in the SSID because the SSID is 32 bytes.

The SSID generating unit 113 is a generating unit for generating the SSID to be used for the wireless communication. The SSID is generated based on a fixed character string stored in the fixed character string storage unit 115, an apparatus name stored in the apparatus name storage unit 116, a terminal identifier stored in the terminal identifier storage unit 112, and identification information of communication setting that the communication control unit 111 has.

Figure 5:
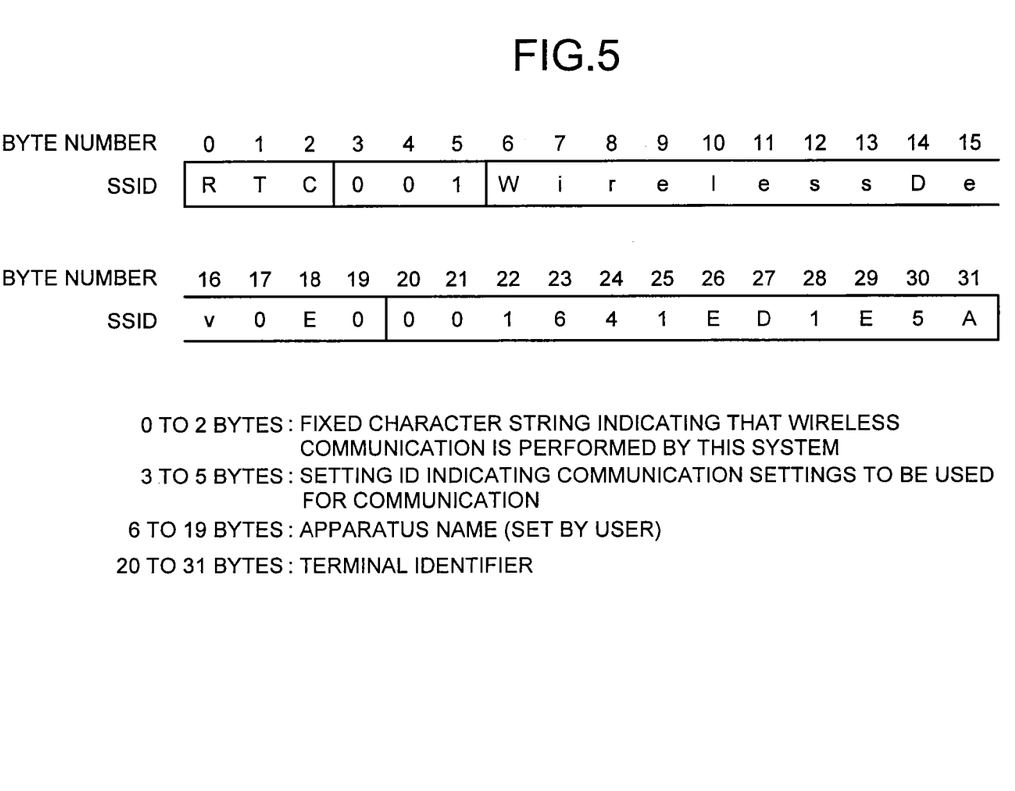
FIG. 5 is a view illustrating an example of an SSID that is generated by an SSID generating unit as illustrated in FIG. 3.

FIG. 5 illustrates an example of the SSID that is generated by the SSID generating unit 113.

The SSID that is generated by the SSID generating unit 113 in the embodiment is formed by coupling the fixed character string, a setting ID, the apparatus name, and the terminal identifier.

The fixed character string among them corresponds to a character string indicating a communication system used in the embodiment. In the example of FIG. 5, "RTC" indicating that the communication is made by the wireless system is set. That is to say, the fixed character string can be also grasped as identification information for specifying a communication system that is used for communication. It should be noted that the fixed character string storage unit 115 stores therein the fixed character string.

Figure 6:
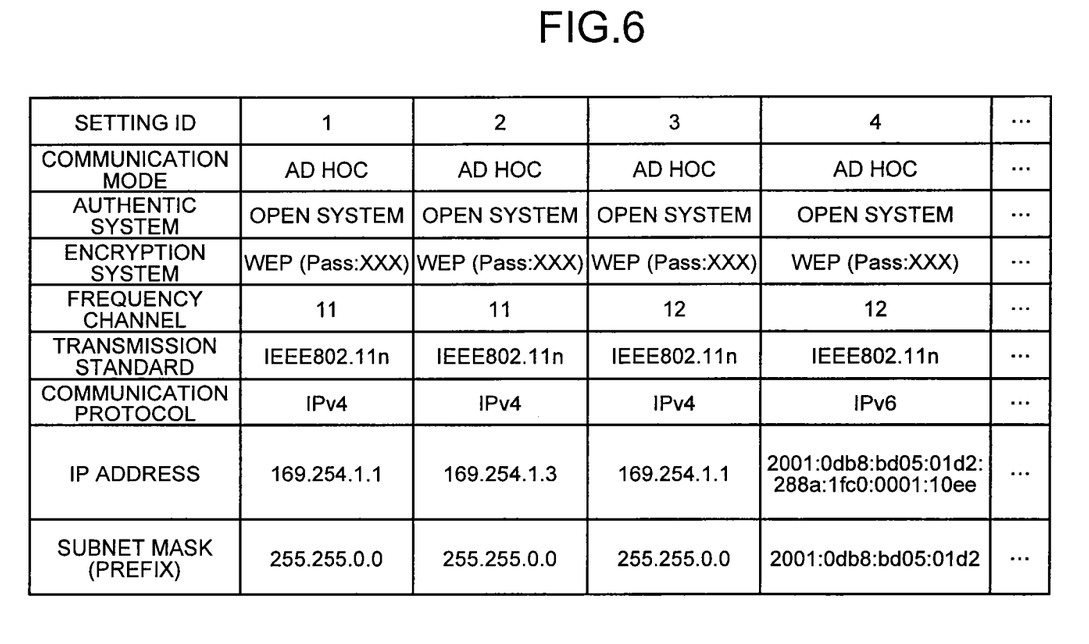
FIG. 6 is a table illustrating an example of communication settings that are stored in a communication setting storage unit as illustrated in FIG. 3.

The setting ID is identification information of the settings used for communication that are stored in the communication setting storage unit 114 (see FIG. 6). "001" indicates that communication is made by using communication setting of a class having the setting ID of 1.

The apparatus name is a name of the communication apparatus 100 that is optionally set by the user and is stored in the apparatus name storage unit 116. In the example of FIG. 5, the apparatus name is a name obtained by combining "WirelessDev" indicating that the apparatus is a wireless communication apparatus and "0E0" as the last three digits of a serial number of the apparatus (apparatus number). Even when the user does not set the name, it is preferable that an initial value be set as illustrated in FIG. 5.

As the terminal identifier, the terminal identifier stored in the terminal identifier storage unit 112 is used.

Information indicating which piece of information is at which byte of the SSID is shared by the connection receiving side and the connection requesting side previously. For example, the information can be shared by installing an application for connecting to the communication apparatus 100 on the communication apparatus 200.

Next, the communication setting storage unit 114 is a setting storage unit for storing therein communication settings to be used for wireless communication that is made by the communication control unit 111.

The communication setting storage unit 114 stores therein communication settings of a plurality of classes to which the setting IDs are assigned as the identification information. The communication settings to be stored in the communication setting storage unit 114 are preferably stored in the ROM 102 as a table when the communication apparatus 100 is manufactured. In addition, the other communication apparatus 200 that is supposed to communicate with the communication apparatus 100 is also configured to store the same communication settings as those stored in the communication apparatus 100.

As in the configuration of the above-mentioned SSID, a configuration is conceivable in which an application for connecting to the communication apparatus 100 is prepared and configured to be able to refer to the communication settings. It is preferable that a user cannot change data as illustrated in FIG. 6 so as to keep the storage contents of the communication settings to be identical between the communication apparatus 100 and the communication apparatus 200.

FIG. 6 illustrates an example of the communication settings. The items of the communication settings include a communication mode, an authentic system, an encryption system, a frequency channel, a transmission standard, a communication protocol, an IP address, and a subnet mask (or prefix).

The communication mode among them indicates a mode of the wireless communication that is performed by the communication control unit 111. For example, the Wifi direct can be set instead of the ad hoc.

The authentic system indicates a system of authentication that is performed when the communication apparatus 100 permits connection from the communication requesting party. For example, a sharing key system can be set instead of an open system.

The encryption system indicates an encryption system of the wireless communication. When passwords or the like is required for connection, the encryption system also contains information thereof. In the example of FIG. 6, the wired equivalent privacy (WEP) is set, so that a WEP key is necessary for the connection. The WEP key is stored in the item of Pass.

The frequency channel is a frequency channel that is used for communication. The transmission standard that is used defines channels capable of being used, and the frequency channel is selected from them to be set.

The transmission standard indicates a transmission standard that is used for the wireless communication. Other standards of the IEEE802.11 series and standards other than the IEEE802.11 series can be also used in addition to the IEEE802.11n.

The communication protocol indicates a communication protocol that is used for upper layer communication after the permission of the connection. Although described here is an example in which an internet protocol version 4 (IPv4) and an internet protocol version 6 (IPv6) are set, protocols other than them can be used.

The IP address is address information of the communication apparatus 100 that is used for communication using the IP. When the communication protocol is the IPv4, an address of the IPv4 is set. When the communication protocol is the IPv6, an address of the IPv6 is set. When another communication protocol is used, an address that is used for the communication protocol is set. It should be noted that the communication apparatus 200 is also configured to store the address of the communication apparatus 100.

The subnet mask is a subnet mask of the communication apparatus 100 that is used for the communication using the IP. Note that the subnet mask is used when the IPv4 is used and a prefix is set to this field because the prefix corresponds thereto when the IPv6 is used. When another communication protocol is used, information necessary for communication using the communication protocol is set appropriately. The communication apparatus 200 is also configured to store, as the subnet mask, the information that is used in the communication apparatus 100.

Regarding the communication setting including the above-mentioned setting items, the communication control unit 111 selects the communication setting of any one class and uses it for communication. Even when the interference failure occurs, the interference failure can be avoided by changing any one of the items of the IP address and the frequency channel. For this reason, as the classes of the communication settings to be used for communication, it is preferable that classes of the communication settings with which only one of the setting items of the IP address and the frequency channel can be changed by switching the class of the communication setting be prepared.

In FIG. 6, in the class of the setting ID "1", a certain value is set to each communication setting item. In the class of the setting ID "2", only a value "169.254.1.3" that is set in the item of the IP address is different from that in the class of the setting ID "1". That is to say, the communication setting of the communication apparatus 100 can be changed to that in which the IP address only is different by switching the class of the communication setting from the setting ID "1" to the setting ID "2" only. Furthermore, in the class of the setting ID "3", only a value "12" that is set in the item of the frequency channel is different from that in the class of the setting ID "1". That is to say, the communication setting of the communication apparatus 100 can be changed to that in which the frequency channel only is different by switching the class of the communication setting from the setting ID "1" to the setting ID "3" only.

Description is returned to FIG. 3. The setting overlap detection unit 117 is a detecting unit for detecting another communication apparatus causing interference failure of the wireless communication by the communication control unit 111 due to overlap of the network identifier. To be specific, first, the setting overlap detection unit 117 detects whether a beacon signal containing the SSID overlapping with that of the communication apparatus 100 is present in the frequency channel(s) used by the communication apparatus 100. When the beacon signal containing the overlapping SSID is present, the setting overlap detection unit 117 transmits a checking packet to the transmission source of the beacon signal so as to check whether the IP address of the transmission source is identical to that of the communication apparatus 100. This checking can be performed by using a well-known protocol. When the IP address is identical, it is determined that another communication apparatus causing the failure of the wireless communication is present. The setting overlap detection unit 117 transmits the result to the setting overlap avoiding unit 118. When the frequency channels that are used are different from each other even when the SSID overlaps, failure of the wireless communication does not occur.

The setting overlap avoiding unit 118 is a changing unit for trying to eliminate overlap of the setting by changing the terminal identifier or the class of the communication setting to be used when the setting overlap detection unit 117 notifies the setting overlap avoiding unit 118 that another communication apparatus causing the failure of the wireless communication is present.

The terminal identifier may be changed automatically in accordance with a predetermined regeneration method. Alternatively, a value desired by the user may be received.

The class of the communication setting to be used can be changed as follows. That is, as in the example as illustrated in FIG. 6, respective classes of the communication settings in which only a specific setting item is different are prepared in the communication setting storage unit 114. With this, the communication setting can be changed to that in which only the IP address or the frequency channel is different from that of another communication apparatus by switching the class of the communication setting. The SSID is generated in accordance with the terminal identifier or the class of the communication setting to be used that has been changed by the setting overlap avoiding unit 118.

The setting overlap avoiding unit 118 changes the terminal identifier or the communication setting so as to make any one of the network identifier, the address information, or the frequency channel of the wireless communication different between another communication apparatus causing the failure of the wireless communication and the communication apparatus 100.

Next, the communication apparatus 200 includes a communication control unit 211, an SSID analysis unit 212, a connection destination selection receiving unit 213, and a communication setting storage unit 214.

The communication control unit 211 has a function of making wireless communication with external apparatuses including the communication apparatus 100 by using any one of the classes of the communication settings stored in the communication setting storage unit 214 and an SSID. Note that the SSID analysis unit 212 analyzes a beacon signal so as to obtain the SSID. Furthermore, the communication control unit 211 has a function of receiving one or a plurality of beacon signals and causing the SSID analysis unit 212 to analyze the signal(s) before the wireless communication.

The SSID analysis unit 212 has a function of extracting the SSID(s) from the beacon signal(s) received by the communication control unit 211 and providing the SSID(s) to the connection destination selection receiving unit 213.

The connection destination selection receiving unit 213 has a function of extracting a terminal identifier of an apparatus as a beacon signal transmission source, an apparatus name thereof, and a setting ID indicating a class of communication setting to be used in the apparatus as the transmission source from the SSID received from the SSID analysis unit 212. The connection destination selection receiving unit 213 also has a function of presenting information that is necessary for a user to determine selection of a connection destination to the user and receiving selection of an apparatus to which the user requests connection. When the communication apparatus 100 displays its own terminal identifier on the display unit 105 or the like, the user who selects the connection destination can select the communication apparatus 100 easily by checking the terminal identifier of the communication apparatus 100 displayed on the display unit 105.

Alternatively, the configuration in which when the connection destination selection receiving unit 213 detects an apparatus having a previously set terminal identifier, it selects the apparatus as the connection destination automatically can be also employed. In addition, the configuration in which when the connection destination selection receiving unit 213 receives a beacon signal from only one apparatus, it selects the apparatus as the connection destination automatically can be employed. Furthermore, the connection destination selection receiving unit 213 can be configured to select an apparatus as the connection destination automatically based on any appropriate algorithm.

In any case, when the apparatus as the connection destination is selected, the connection destination selection receiving unit 213 notifies the communication control unit 211 of the connection destination and transmits the SSID and the setting ID extracted from the SSID to the communication control unit 211. Then, the communication control unit 211 selects the class of the communication setting indicated by the setting ID from the communication settings stored in the communication setting storage unit 214 and requests connection to the connection destination in accordance with the SSID and the communication setting thereof.

When the request is received, the communication apparatus 200 comes into a state where it can transmit and receive upper layer data to and from the apparatus as the connection destination (for example, communication apparatus 100).

As described above, the communication setting storage unit 214 is configured to store therein the same communication settings as those stored in the communication setting storage unit 114 of the apparatus as the connection destination.

Figure 7:
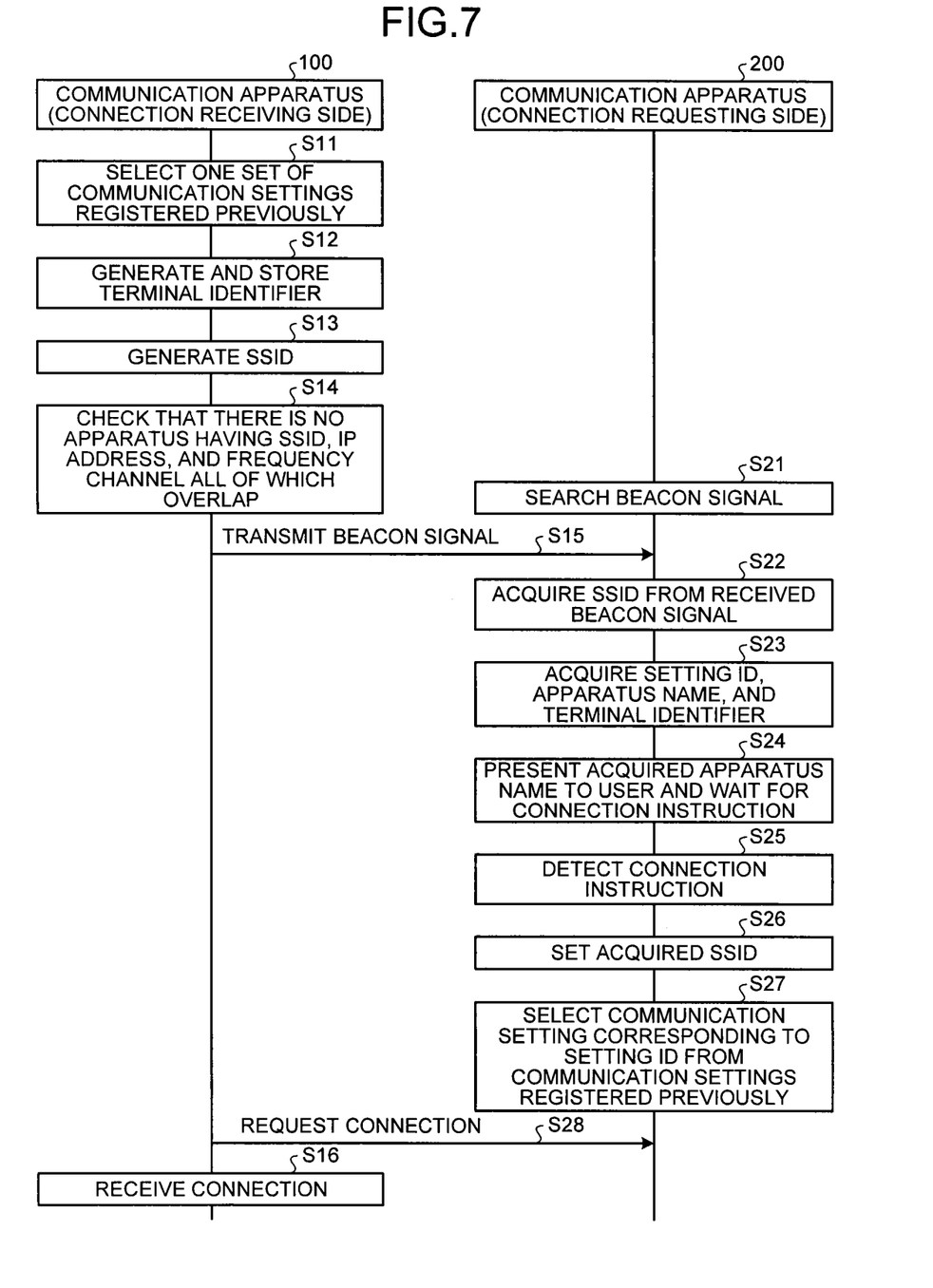
FIG. 7 is a flowchart illustrating an example of operations that are executed by the one communication apparatus and the other communication apparatus as illustrated in FIG. 2 when a communication path is established between these apparatuses.

Next, FIG. 7 illustrates processing procedures that are executed by the communication apparatus 100 and the communication apparatus 200 until the communication path is established between these apparatuses. FIG. 7 illustrates an example of the case where the communication apparatus 100 performs setting of wireless communication including selection of the communication setting, generation of the terminal identifier, and generation of the SSID automatically and the communication path can be established with no particular problem.

First, when the communication apparatus 100 at the connection receiving side is powered ON or when the wireless communication function is made valid after the communication apparatus 100 is powered ON, the communication apparatus 100 starts operations from step S11 in FIG. 7.

The communication control unit 111 selects one of the communication settings having been registered previously as illustrated in FIG. 6 (S11). The class of the communication setting to be used may be selected in accordance with the priority order that has been set as appropriate. For example, the class of the communication setting may be selected in the order from that selected in the previous communication or from that having the highest priority.

Next, the terminal identifier storage unit 112 stores therein the terminal identifier generated after the wireless communication function is made valid (S12). When the user is allowed to set the terminal identifier as illustrated in FIG. 4C, it is sufficient that the user checks that the terminal identifier is stored in the terminal identifier storage unit 112.

Then, the SSID generating unit 113 generates the SSID as illustrated in FIG. 5 based on the fixed character string stored in the fixed character string storage unit 115, the apparatus name stored in the apparatus name storage unit 116, the setting ID of the communication setting selected at step S11, and the terminal identifier stored at step S12 (S13).

After the SSID is generated, the setting overlap detection unit 117 checks that there is no another communication apparatus having an SSID overlapping with the SSID generated at step S13 (S14). That is to say, the setting overlap detection unit 117 checks that no beacon signal is transmitted from another communication apparatus causing failure of the wireless communication.

When the setting overlap detection unit 117 checks that there is no another communication apparatus causing the failure of the wireless communication, the communication control unit 111 generates a beacon signal containing the SSID generated at step S13 and transmits the beacon signal to the periphery (S15).

On the other hand, when the communication apparatus 200 is powered ON or when the wireless communication function is made valid after of the communication apparatus 200 is powered ON, the communication apparatus 200 starts operations from step S21 in FIG. 7.

First, the communication control unit 211 searches a beacon signal (S21). The search is performed while switching the frequency channel or the transmission standard appropriately so as to also detect beacon signals that are transmitted by using any class of the communication setting stored in the communication setting storage unit 214.

Then, the communication control unit 211 detects the beacon signal transmitted from the communication apparatus 100 at step S15, the communication control unit 211 transmits the received beacon signal to the SSID analysis unit 212. The SSID analysis unit 212 acquires the SSID from the received beacon signal and transmits it to the connection destination selection receiving unit 213 (S22). Thereafter, the connection destination selection receiving unit 213 extracts the setting ID, the apparatus name, and the terminal identifier from the SSID (S23). These pieces of information can be acquired by cutting out data of specific bytes of the SSID.

Subsequently, the connection destination selection receiving unit 213 presents the apparatus name extracted at step S23 to the user and waits for a connection instruction. When a plurality of beacon signals are detected, acquisition at steps S22 and S23 is performed for the respective beacon signals. Then, the apparatus names corresponding to the respective beacon signals are presented at step S24.

When the connection destination selection receiving unit 213 detects the connection instruction from the user with respect to a communication apparatus having any one of the apparatus names (S25), it transmits the SSID of the communication apparatus as the connection destination and the setting ID extracted from the SSID that have been acquired at step S23 to the communication control unit 211. The communication control unit 211 sets the acquired SSID to be used for communication (S26). After the SSID is set, the communication control unit 211 sets a communication setting to be used for communication from settings stored in the communication setting storage unit 214 (S27). Then, the communication control unit 211 transmits a connection request by wireless communication to the periphery by using the SSID and the communication setting (S28). Because the IP address contained in the communication setting that has been registered previously is an address that is used by the communication apparatus at the request receiving side, the communication apparatus 200 at the connection requesting side appropriately sets a value that does not overlap with the IP address contained in the communication setting.

When the communication control unit 111 detects the connection request of the wireless communication that has been transmitted at step S28, the communication control unit 111 finds that the connection request is a connection request to the wireless network having the same SSID as that thereof and performs necessary authentic processing and/or the like with the communication apparatus 200 as the transmission source. When it is determined that communication is allowed to be performed as a result of the authentic processing, the communication apparatus 100 accepts the connection with the communication apparatus 200 (S16).

This establishes connection between the communication apparatus 100 and the communication apparatus 200. With this, data can be transmitted and received between the communication apparatus 100 and the communication apparatus 200 without using an access point.

Figure 8:
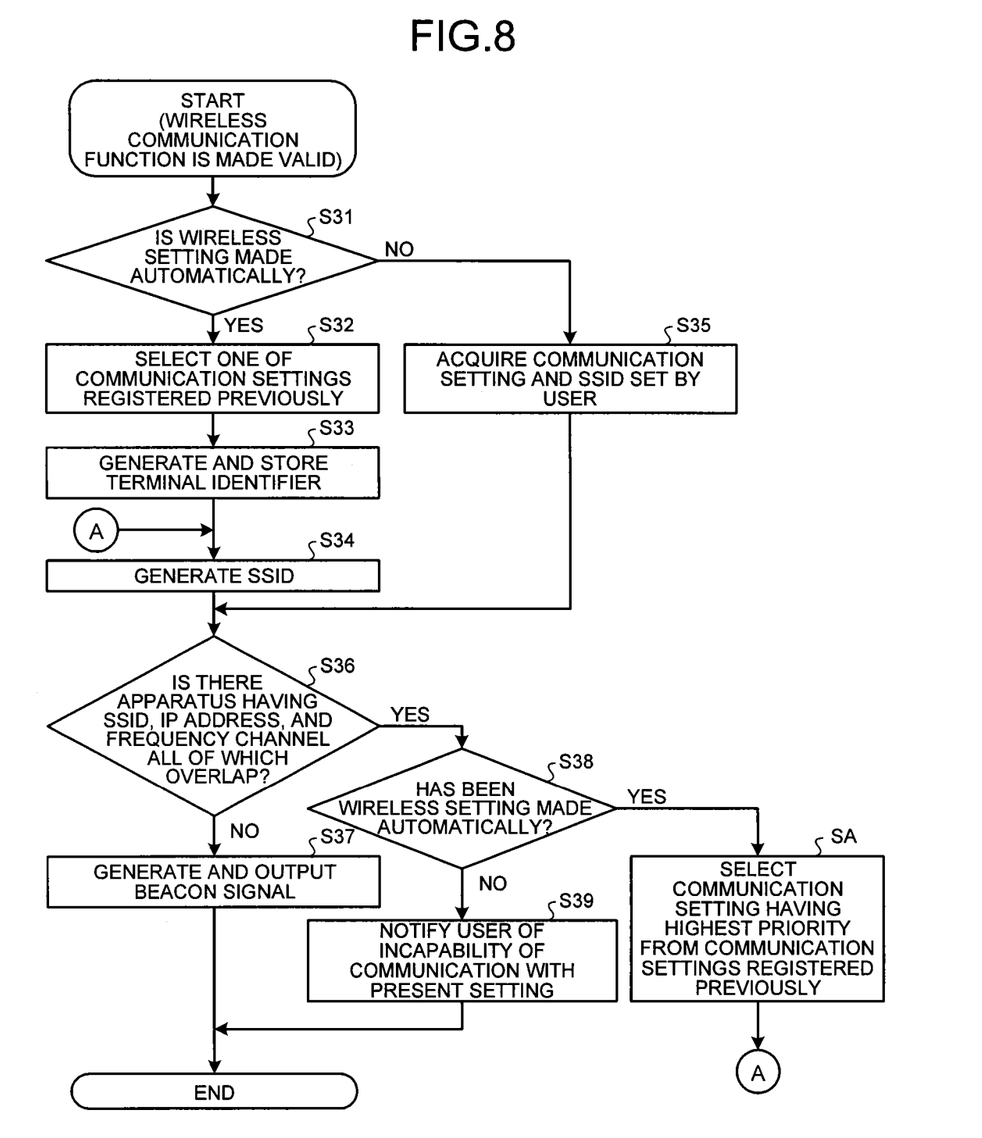
FIG. 8 is a flowchart illustrating pieces of processing corresponding to those at steps S11 to S15 in FIG. 7 that are executed by a central processing unit (CPU) of the one communication apparatus.

Next, FIG. 8 is a flowchart illustrating processing procedures from when the wireless function is made valid until the communication apparatus 100 checks that there is no another communication apparatus having the overlapping SSID and transmits the beacon signal.

The communication apparatus 100 starts the process as illustrated in FIG. 8 when it is powered ON or when the wireless communication function is made valid after it is powered ON.

First, the communication apparatus 100 determines whether setting of the wireless communication is made automatically (S31). It is conceivable to set whether the automatic setting is made in conjunction with a communication mode, for example. For example, the automatic setting is not made in an infrastructure mode in which the number of apparatuses joining the network is expected to be large, while the automatic setting is made in an ad hoc mode in which the number of apparatuses joining the network is expected to be small and a physical distance is expected to be close. It is also conceivable that the user is allowed to make setting. In this case, it is desired that default setting is made such that automatic setting is selected in consideration of a user with less knowledge relating to the setting.

When the setting of the wireless communication is made automatically at step S31, selection of the communication setting, generation of the terminal identifier, and generation of the SSID are performed at steps S32 to S34. The pieces of processing that are performed at steps S32 to S34 are the same as those at step S11 to S13 in FIG. 7.

On the other hand, when the setting of the wireless communication is not made automatically at step S31, the communication control unit 111 acquires communication setting and an SSID that have been set by the user at step S35. Any of the communication settings stored in the communication setting storage unit 114 is allowed to be selected or the respective items of the communication setting is allowed to be set individually.

Thereafter, the process proceeds to step S36 regardless of whether the communication setting has been set automatically. Then, the setting overlap detection unit 117 determines whether another communication apparatus having the SSID, the IP address, and the frequency channel all of which overlap is located at a position causing failure of the communication (S36). The position causing failure of the communication corresponds to a range where electric waves can be received and the network communication cannot be made normally when there is the apparatus having common setting.

When the corresponding apparatus is not found at step S36 (N at step S36), the CPU 101 generates the beacon signal on the communication control unit 111 based on the setting at steps up to step S34 or at step S35 and outputs it (S37), and finishes the processing. Thereafter, whether there is an apparatus requesting communication based on the beacon signal is monitored by another processing.

When the corresponding apparatus is found at step S36 (Y at step S36), the wireless communication cannot be made as it is. In order to cope with this condition, the process proceeds to pieces of processing at step S38 and subsequent steps.

Then, it is determined whether setting of the wireless communication has been made automatically at step S38. When the setting of the wireless communication has been made automatically (Y at step S38), the setting overlap avoiding unit 118 switches to a communication setting of a class having the highest priority next to a communication setting of a class that is being used currently among the communication settings registered in the communication setting storage unit 114 previously (SA). The priority order for switching the class of the communication setting is preferably set such that the class of the communication setting can be switched not to a class of communication setting in which the setting is largely different from the communication setting that is being used currently but to a class of communication setting in which only setting overlapping with another communication apparatus is different therefrom.

After the class of the communication setting to be used is changed at step SA, the process returns to step 34. Then, the setting overlap avoiding unit 118 notifies the SSID generating unit 113 of the identification ID of the class of the communication setting that is newly used. The SSID generating unit 113 changes the SSID by using the notified identification ID. Accordingly, not only the different communication setting but a different value of the SSID are set by switching the class of the communication setting to be used. This eliminates communication failure with another communication apparatus.

When it is determined that there is no another communication apparatus having the overlapping SSID at step 36, the communication control unit 111 starts output of the beacon signal at step S37.

When the interference failure with another communication apparatus is still generated even with the communication setting and the SSID after changed, the process proceeds to step S38 and the class of communication setting to be used is changed again. The processing at step SA is executed until the SSID no longer overlaps with that of the other communication apparatus.

That is to say, the communication apparatus 100 executes the above-mentioned pieces of processing so as to change the network identifier so as to switch the class of communication setting. The IP address or the frequency channel is changed by switching the class of communication setting so as to avoid the interference failure with another communication apparatus due to overlap of the network identifier. Accordingly, even a user with little knowledge relating to the network communication can avoid the interference failure of the wireless communication due to overlap of the setting easily. A method of avoiding the interference failure by changing the communication setting is effective in the case where the terminal identifier cannot be changed as appropriate such as the case where the terminal identifier contains the MAC address.

The common communication settings are registered previously in the communication apparatus 100 and the communication apparatus 200. This enables the communication apparatus 200 to change the setting for connecting to the communication apparatus 100 easily even when the class of communication setting to be used is changed in the communication apparatus 100.

To be specific, the SSID in the beacon signal of the communication apparatus 100 contains identification information of the class of communication setting to be used. The communication apparatus 200 can know the class of communication setting that is used by the communication apparatus 100 from the beacon signal. This enables the communication apparatus 200 to connect to the communication apparatus 100 easily by changing the class of communication setting based on the identification information of the class of communication setting that has been obtained from the beacon signal.

Furthermore, with the method using the setting ID as the identification information of the class of communication setting, for the SSID, setting contents do not leak to other communication apparatuses having no table of communication settings as illustrated in FIG. 6 that is used by the communication apparatus 100. Furthermore, the communication setting to be used for communication can be shared among the communication apparatuses through the setting ID, leading to improvement in security.

Furthermore, even when the communication apparatus 200 does not grasp the class of communication setting that is used by the communication apparatus 100 previously, it is sufficient that the communication apparatus 200 detects a beacon signal of the communication apparatus 100 in a range of the communication settings that are used by the communication apparatus 100. As a result, the communication apparatus 200 can reduce the processing burden relating to detection of the communication apparatus 100.

It is not essential that the communication setting is selected from the classes previously registered. The communication apparatus 100 may detect communication setting that does not overlap with those of other communication apparatuses automatically, and set the communication setting. In addition, it is not also essential that the SSID contains the setting ID.

The detection of the apparatus causing the communication failure as performed at step S36 in FIG. 8 is preferably performed appropriately also after the communication path is established between the communication apparatus 100 and the communication apparatus 200 once. When the communication failure is detected, the pieces of processing at step S38 and subsequent steps are performed so as to avoid the interference failure with another communication apparatus preferably. In this case, the communication apparatus 200 also performs the pieces of processing relating to the establishment of communication with the communication apparatus 100 again.

Figure 9:
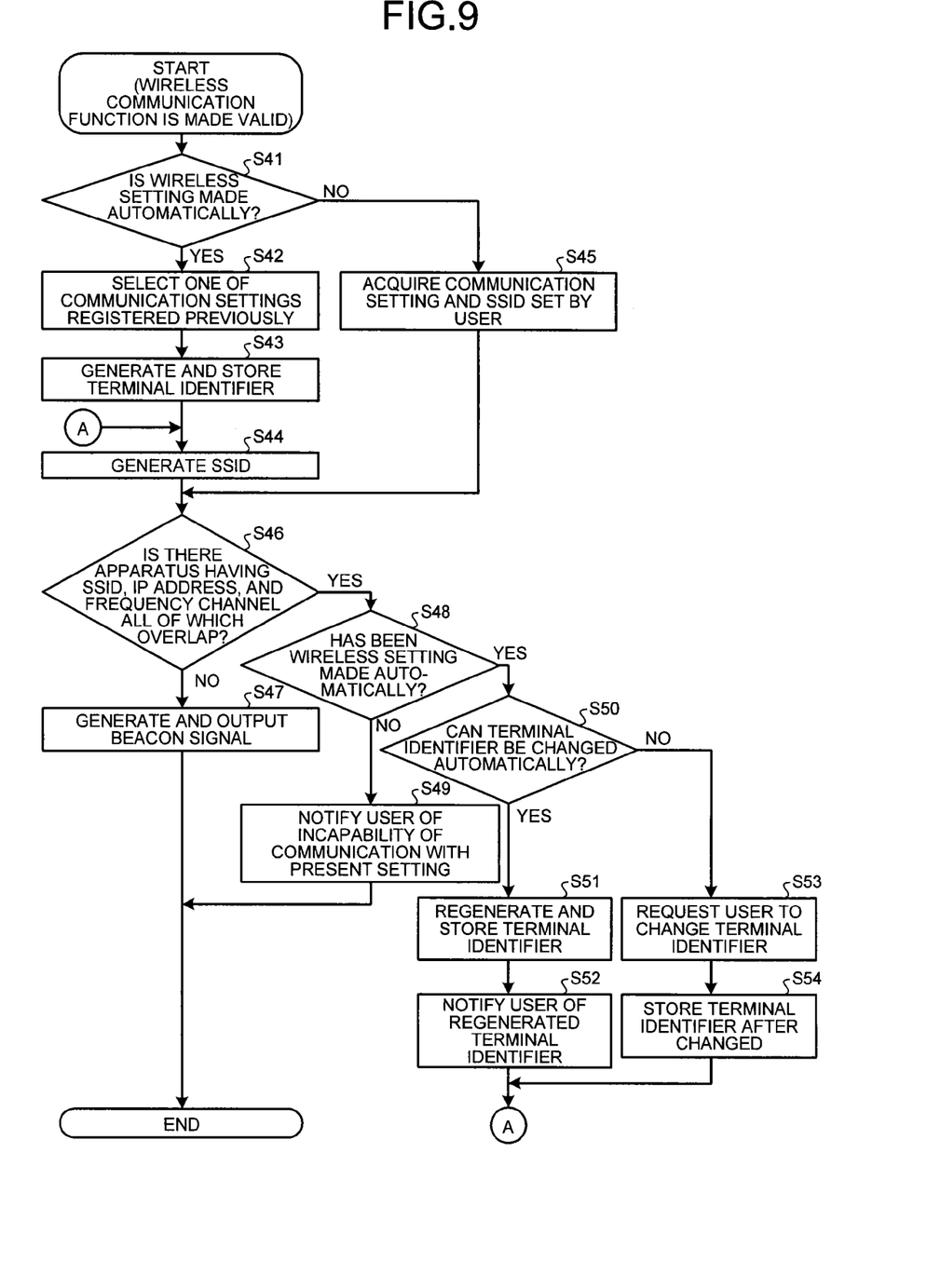
FIG. 9 is a flowchart illustrating another example.

Next, described is a modification of the process in FIG. 8 with reference to FIG. 9.

The communication apparatus 100 may start the process as illustrated in FIG. 9 instead of the process as illustrated in FIG. 8 when it is powered ON or when the wireless communication function thereof is made valid after it is powered ON.

The pieces of processing at step S41 to step S49 in the process are the same as those at step S31 to step S39 in the process as illustrated in FIG. 8 and description thereof is omitted.

The communication apparatus 100 determines whether setting of wireless communication is made automatically (S48). The determination is the same as the processing that is performed at step S41. Then, when the setting of the wireless communication is not made automatically (N at step S48), it is not preferable that the setting be changed without notifying the user. For this reason, the communication apparatus 100 notifies the user of incapability of communication with the present setting (S49), and the process is finished. The communication apparatus 100 can notify the user of it by any appropriate method such as display on the display unit 105, audio output from a speaker (not illustrated), and lighting or flashing of a lamp.

The communication apparatus 100 determines whether automatic change of the terminal identifier is permitted (S50). The capability or incapability of the automatic change of the terminal identifier is ser previously by the user.

When the terminal identifier can be changed automatically (Y at step S50), the setting overlap avoiding unit 118 regenerates the terminal identifier by any appropriate method. Thereafter, the terminal identifier storage unit 112 stores therein the regenerated terminal identifier (S51) and notifies the user of the regenerated terminal identifier (S52). After that, the process is returned to step S44 and the pieces of processing are repeated.

The terminal identifier is desirably regenerated by a method guaranteeing generation of the terminal identifier different from the terminal identifier that is currently set. When the terminal identifier is used in an application other than generation of the SSID, the terminal identifier is designed to be regenerated by a method without interfering with the application. The communication apparatus 100 can notify the user of the terminal identifier by any appropriate method such as display on the display unit 105 and audio output from a speaker (not illustrated).

On the other hand, when the terminal identifier cannot be changed automatically at step S50 (No at step S50), the communication apparatus 100 requests a user to change the terminal identifier (S53). For example, a screen requesting the user to input a new terminal identifier may be displayed on the display unit 105. Then, when the terminal identifier is changed, the terminal identifier storage unit 112 stores therein the terminal identifier after changed (S54). Thereafter, the process is returned to step S44 and the pieces of processing are repeated.

The terminal identifier after changed is used for the generation of the SSID at step S44. Accordingly, the SSID becomes a value different from that before changed and overlap of the SSID with another communication apparatus found at the previous step S46 is eliminated. When another communication apparatus having the overlapping SSID is not found at step S46, the process proceeds to step S47 and the communication control unit 111 starts output of the beacon signal.

When the interference failure with another communication apparatus is not eliminated in the case where the SSID after changed further overlaps with that of the other communication apparatus, and so on, the pieces of processing at step S48 and subsequent steps are repeated until the interference failure with another communication apparatus is eliminated.

The communication apparatus 100 executes the above-mentioned pieces of processing. With this, when the communication apparatus 100 detects another communication apparatus causing interference failure of wireless communication, the interference failure with another communication apparatus due to overlap of the network identifier, the IP address, and the frequency channel can be avoided by changing the terminal identifier and the network identifier automatically. Accordingly, even a user with little knowledge relating to the network communication can avoid the interference failure of the wireless communication due to the overlap of the setting easily.

It is sufficient that the information to be used for the generation of the SSID is information capable of being changed as appropriate, and the information is not necessarily the terminal identifier. However, the terminal identifier capable of being changed freely is preferable as a tool of changing the SSID automatically. When automatic change of the SSID arises no problem, the SSID can be changed directly. For example, any appropriate character string is added behind the SSID having been used.

In the change of the terminal identifier, the communication apparatus 100 notifies the user of change of the terminal identifier when the terminal identifier has been changed. This can prevent the setting from being changed without user's knowledge. It should be noted that the notification is not essential.

The description of the embodiment is finished. In the invention, detailed configurations of the respective apparatuses, processing contents, data structure, the number of apparatuses that are used, and the like are not limited to those described in the embodiment.

For example, the items that are previously stored as the communication setting are not limited to those as illustrated in FIG. 6. Furthermore, the configuration in which values indicating that optional setting can be made can be set as a part of the items instead of specific values may be employed. In this case, it is sufficient that initial value set and stored previously by the user is set to the corresponding item.

Furthermore, the above-mentioned functions of the communication apparatus 100 or the communication apparatus 200 may be provided on a plurality of apparatuses in a dispersed manner and the functions may be executed in corporation of these apparatuses.

Furthermore, it is apparent that the communication apparatus 100 can be configured to be capable of communicating with the plurality of communication apparatuses 200 at the same time.

In addition, an embodiment of a computer program according to the invention is a computer program for causing a computer to execute the above-mentioned functions of the communication apparatus 100 or the communication apparatus 200.

The program may be preferably stored in a storage unit originally included in the computer, such as a read only memory (ROM). Alternatively, the program can be also provided by being recorded in non-volatile storage media (memories) such as a compact disc read only memory (CD-ROM), a flexible disk, a static random access memory (SRAM), an electrically erasable programmable read only memory (EEPROM), and a memory card.

Furthermore, the program can be executed by being downloaded from an external apparatus that is connected to a network and includes a storage medium recording the program or an external apparatus that is connected to the network and stores the program in a storage unit.

It should be noted that a changing unit described in the scope of the invention corresponds to the setting overlap avoiding unit 118 in the specification.

Obviously the configurations in the embodiment and modifications as described above can be executed by combining them as appropriate as long as no inconsistency arises.

With the above-mentioned configuration, even a user with little knowledge relating to the network communication can avoid failure of wireless communication due to overlap of setting easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus capable of wireless communication with a requesting apparatus and without using an access point, by using a network identifier having communication identification information identifying a class of a communication setting containing an IP address and frequency information, the communication apparatus comprising:
    a memory that stores therein communication settings of a plurality of classes to be used for the wireless communication; and
    circuitry configured to:
        detect another communication apparatus causing failure of the wireless communication between the communication apparatus and the requesting apparatus due to overlap of the network identifier;
        change the network identifier when the another communication apparatus causing the failure of the wireless communication between the communication apparatus and the requesting apparatus is detected; and
        change the class of the communication setting that is stored in the memory and that is currently being used to another class of another communication setting having a highest priority next to the class of the communication setting that is currently being used when the another communication apparatus causing the failure of the wireless communication between the communication apparatus and the requesting apparatus is detected, a priority order for changing the class of the communication setting is set such that the class of the communication setting is changed to the another class of the another communication setting in which only a setting overlapping with the another communication apparatus is different from the communication setting that is currently being used,
        wherein the circuitry is configured to change the network identifier so as to change the IP address of the communication apparatus or a frequency that the communication apparatus uses.

2. The communication apparatus according to claim 1, wherein
    the circuitry is configured to change the class of the communication setting to be used for the wireless communication to the another class of the another communication setting stored in the memory when the circuitry detects the another communication apparatus causing the failure of the wireless communication.

3. The communication apparatus according to claim 1, wherein the network identifier is a service set identifier (SSID).

4. The communication apparatus according to claim 1, wherein the circuitry is configured to transmit a checking packet to the another communication apparatus to check whether an IP address of the another communication apparatus is identical to that of the communication apparatus.

5. The communication apparatus according to claim 4, wherein when the IP address of the another communication apparatus is identical to that of the communication apparatus, the circuitry is configured to determine that the another communication apparatus causing the failure of the wireless communication is present.

6. The communication apparatus according to claim 1, wherein the network identifier is generated based on a fixed character string, a name of the communication apparatus, a setting ID of the communication setting, and a terminal identifier.

7. The communication apparatus according to claim 1, wherein the circuitry is configured to generate a beacon signal, and to detect a connection request from the requesting apparatus, the connection request being generated by the requesting apparatus based on the beacon signal received by the requesting apparatus.

8. The communication apparatus according to claim 7, wherein the circuitry is configured to perform authentication of the connection request, and to establish the wireless communication between the communication apparatus and the requesting apparatus based on said authentication.

9. The communication apparatus according to claim 1, wherein the circuitry is configured to detect the another communication apparatus that causes the failure of the wireless communication between the communication apparatus and the requesting apparatus due to overlap of the network identifier based on a beacon signal received from the another communication apparatus.

10. The communication apparatus according to claim 1, wherein the circuitry is configured to change the IP address of the communication apparatus when the circuitry detects the another communication apparatus causing the failure of the wireless communication between the communication apparatus and the requesting apparatus.

11. The communication apparatus according to claim 1, wherein the circuitry is configured to change the network identifier based on an identification ID of the another class of the another communication setting.

12. A computer program product comprising a non-transitory computer-usable medium having computer-readable program codes embodied in the non-transitory computer-usable medium, wherein the program codes when executed cause a processor of a communication apparatus, including a memory that stores therein communication settings of a plurality of classes to be used for wireless communication, capable of the wireless communication with a requesting apparatus and without using an access point, by using a network identifier having communication identification information identifying a class of a communication setting containing an IP address and frequency information to execute a method comprising:
- detecting another communication apparatus causing failure of the wireless communication between the communication apparatus and the requesting apparatus due to overlap of the network identifier;
- changing the network identifier so as to change the IP address of the communication apparatus or a frequency that the communication apparatus uses when the another communication apparatus causing the failure of the wireless communication between the communication apparatus and the requesting apparatus is detected at the detecting; and
- changing the class of the communication setting that is stored in the memory and that is currently being used to another class of another communication setting having a highest priority next to the class of the communication setting that is currently being used when the another communication apparatus causing the failure of the wireless communication between the communication apparatus and the requesting apparatus is detected, a priority order for changing the class of the communication setting is set such that the class of the communication setting is changed to the another class of the another communication setting in which only a setting overlapping with the another communication apparatus is different from the communication setting that is currently being used.

13. The computer program product of claim 12, further comprising changing the network identifier based on an identification ID of the another class of the another communication setting.

* * * * *